United States Patent [19]

Stasiunas

[11] 4,404,985
[45] Sep. 20, 1983

[54] AIR-LIQUID VALVES FOR OFF-THE-ROAD VEHICLE TIRES

[75] Inventor: Carl Stasiunas, Altavista, Va.

[73] Assignee: National Distillers and Chemical Corporation, New York, N.Y.

[21] Appl. No.: 309,741

[22] Filed: Oct. 8, 1981

Related U.S. Application Data

[63] Continuation of Ser. No. 144,517, Apr. 12, 1980, abandoned.

[51] Int. Cl.³ .............................................. F16K 15/20
[52] U.S. Cl. .................................. 137/234.5; 152/429; 251/149.1; 137/223
[58] Field of Search ........................... 137/223, 234.5; 152/429; 289/200; 251/149.1

[56] References Cited

U.S. PATENT DOCUMENTS

| | | | |
|---|---|---|---|
| 2,188,713 | 1/1940 | Gora | 137/223 |
| 2,198,122 | 4/1940 | Martin | 137/223 |
| 2,254,000 | 8/1941 | Broecker | 137/223 |
| 2,625,170 | 1/1953 | Mayer | 137/223 |
| 3,421,535 | 1/1969 | Hawkes | 137/234.5 |
| 3,422,836 | 1/1969 | Hawkes | 137/234.5 |
| 3,627,264 | 12/1971 | Scherer | 137/223 |

Primary Examiner—Harold W. Weakley
Attorney, Agent, or Firm—Kenneth D. Tremain

[57] ABSTRACT

A valve structure for heavy duty applications in connection with off-the-road or agricultural vehicle tires. Such applications involve a substantial increase in the weight of tires so that the vehicles will acquire stability in maneuvering; e.g. in the case of muddy, rocky, hilly conditions or the like.

1 Claim, 2 Drawing Figures

AIR-LIQUID VALVES FOR OFF-THE-ROAD VEHICLE TIRES

This application is a continuation, of application Ser. No. 144,517, filed Apr. 12, 1980 now abandoned.

BACKGROUND, OBJECT AND SUMMARY OF THE INVENTION

The present invention pertains to valves useful in heavy construction application, and more particularly, to valves that are to be used on tubes disposed in off-the-road or agricultural vehicle tires.

It has been known to employ for a variety of purposes valves having stems formed of molded rubber. Such devices commonly include embedded metal inserts inside of which a valve core is contained or housed. In order to provide background material for a consideration of the present invention, reference may be made to U.S. Pat. No. 2,652,067 in which a valve useful in connection with tubes of automobile tires is disclosed, such valve having the aforenoted molded rubber stem and further including an embedded insert and a valve core within said insert. However, the valve structure disclosed in that patent includes a constriction in its bore in the form of an internal resilient annular shoulder which functions to provide the requisite valve seat, or alternately, a stop for a valve core abutment. In either case, such configuration involves a restriction in the pathway provided by the bore. Therefore, such a construction is totally inappropriate in the case of a valve which is required to pass a liquid flow, in which case a substantially smooth and continuously wide diameter bore is essential.

A valve stem formed of molded rubber that has been known before, and which is adapted for use in connection with heavy duty applications, that is to say, off-the-road applications involving operation on rough terrain such as hills, muddy and rocky locations and the like, is that shown hereinafter in FIG. 1 of the drawing. Such a molded valve includes a commonly used short or stub-valve core, chiefly for the reason that such valve core is easier to make and hence less expensive.

A further feature of the known valve device is that interlocking engagement between the valve insert and the molded rubber body is accomplished by reason of rubber material being forced in the molding operation into a groove at the lower end of the valve insert. This will become apparent as the description of the known device proceeds.

The fundamental difficulty that has been encountered in the use of the known heavy duty valve device results from the fact that in order to increase the weight of the previously noted vehicles utilized in heavy duty work on rough terrain, it is customary to add a clacium chloride-water solution to the tire tubes in addition to the requisite amount of air. Of course, it will be appreciated that the calcium chloride is employed in order to prevent the water from freezing under adverse conditions.

It has been discovered that with the current design, that is to say, with the currently used heavy duty valves, liquid splashes onto exposed portions of the valve insert, causing the end of the insert to corrode and thereby allowing the vulcanized bond between the rubber and the metal insert to be broken with consequent loss of air from the tube, and resultant damage to the tire.

Accordingly, it is a primary object of the present invention to overcome the aforesaid problem relating to corrosion of a valve insert in a heavy duty valve environment in which a liquid present in the tube is the source of the problem.

Another object is precisely to eliminate the problem defined so as to avoid expensive flat tire repairs on vehicles of the type described.

Another object is to overcome the problem without resorting to any techniques or methods which would result in hampering the flow of the required liquid into the tubes with which the valves are used.

Yet another object is to accomplish or effectuate the solution explained above but to do so with a minimum of expense involved in providing rubber at the interior of the valve bore.

A still further object is to accomplish the aforenoted solution so as to eliminate the corrosion problem and yet to maintain the interlocking engagement between the bonded rubber and the valve insert.

The above-noted objects, as well as others, are fulfilled by a primary feature of the invention according to which the lower end of the molded rubber valve is formed so as to have a hook-like annular projection at its end and the rubber is molded around this hook-like portion whereby the necessary locking or interengaging relationship is established in a bonded fashion between the metal of the insert and the rubber. Moreover, the rubber is molded at the interior portion in such a way as to define the bore so that the diameter of the bore at its exit end is at least as great as the diameter for the bore defined throughout the metal insert. In other words, the molded rubber at the interior does not act in any constricting way to impede the flow of liquid through the bore, and as aforenoted, the diameter of the bore defined by the rubber is no less than the diameter which prevails throughout the major extent of the interior of the metal insert, that is, the inner periphery or bore as defined by the metal insert.

Other and further objects, advantages and features of the present invention will be understood by reference to the following specification in conjunction with the annexed drawing, wherein like parts have been given like numbers.

DESCRIPTION OF PREFERRED EMBODIMENTS

Figure 1:
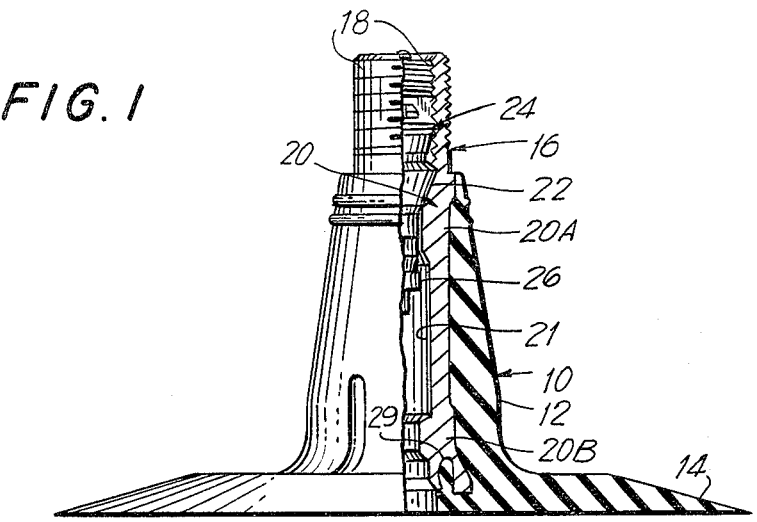
FIG. 1 is an elevation view partly in section of a valve device for heavy duty applications involving the use of air and liquid.

Referring now to the figures of the drawing, there will be seen in FIG. 1 a known valve device for heavy duty applications involving the use of such device in connection with a rubber tube or the like that is to be filled with both air and liquid. Specifically, the liquid would be a water-calcium chloride solution. The use of such a solution insures that the tubes will be sufficiently loaded that the vehicle will be able to maneuver in a stable manner over rough and difficult terrain; in other words, the context is one where although the vehicle may be used occasionally on pavement, it will generally be subjected to rough usage over hilly, muddy, or rocky terrain.

In the known valve construction, it will be seen that a rubber body 10 has a tubular stem portion 12 and integral therewith a flange or base member 14, the flange serving for mounting the device to the tube of a heavy duty vehicle tire. The body 10 is preferably molded of resilient rubber or the like by the use of conventional molding techniques. A tubular metal insert 16 has an internally and externally threaded top portion 18 and a main or body portion 20 disposed within the molded rubber stem portion 12.

The upper part 20A of the body portion 20 is suitably tapered so as to effectuate the requisite static seal at its inner periphery or bore 21. This seal is produced by contact of a gasket 22, included as part of the stub or short valve core 24, with the tapered portion. The valve core 24 has a conventional cup-shaped member 26 which includes a rubber washer or grommet bearing against the lower end of the barrel of such core 24 to provide the required dynamic seal.

Because of the heavy duty application for this valve structure, the construction of the main or body portion 20 is generally tubular with a fairly constant outside diameter. However, the thickness of the wall is somewhat greater at the upper and lower parts 20A and 20B. It should be especially noted, however, that a relatively lesser thickness, hence a larger internal diameter for the bore 21, is provided for the most part, so as to permit free flow of the liquid which is to be injected or flowed into the tube to which the valve device is attached. Thus, there is an extended fixed internal diameter for the bore 21 substantially throughout its length from the point at which liquid enters the bore to the point at which it exits.

It will be seen at the inner termination of the valve insert 16 that a suitable groove 29 is provided such that when the molding operation is performed, rubber will be forced into the groove, thereby to bring about a firm locking engagement of the rubber with the insert.

Figure 2:
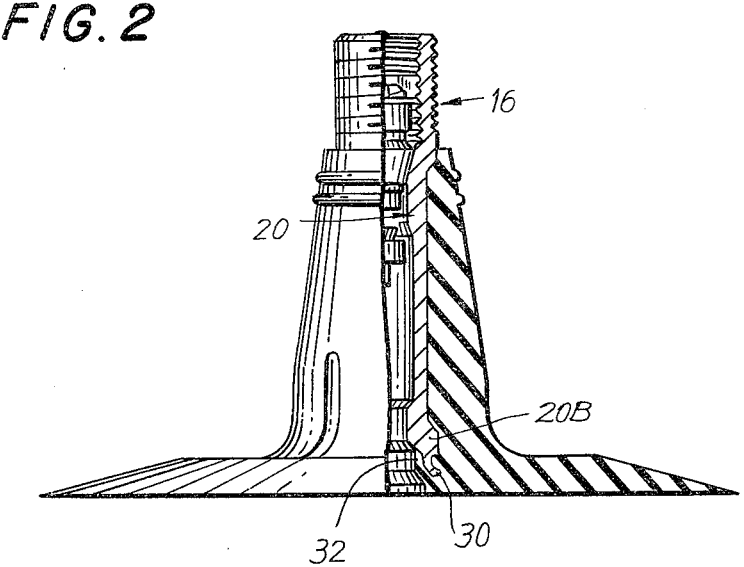
FIG. 2 is a valve device in accordance with a preferred embodiment of the present invention.

Despite the benefits which attend the application of the valve device depicted in FIG. 1, it has been discovered that corrosion does take place in the case of a water-calcium chloride solution for heavy duty applications. Accordingly, the improvement of the present invention provides a solution to that problem while retaining the advantages of the previous construction. Thus, as will be seen in FIG. 2, the essential valve construction previously noted in FIG. 1 is provided, except that at the lower or inner end of the valve the insert 16 is so formd as to have a hook-like annular projection 30 such that when rubber is molded around this hook-like portion to an appropriate extent, the necessary locking or interengaging relationship is firmly established between insert and the bonded rubber. However, the required wide diameter for the bore is not diminished in any way such that liquid can flow freely through the entire bore and into the tire tube.

The hook-like annular portion extends downwardly from a point close to the center line of the slightly thickened wall portion 20B and extends outwardly from the valve axis as the portion 30 reaches its termination. In the molding process the rubber is so molded so as to extend up to the slightly thickened wall portion 20B. Accordingly, the rubber portion 32 located inwardly of the hook-like portion 30 serves to define the inner end of bore 21, such rubber portion 32 having a diameter at least as large as the upper part of bore 21; that is to say, the upper part which extends between the thickened portions 20A and 20B. Also by this particular arrangement, the end of the insert 6 is protected; thus it is ensured that any normal splashing of the water-calcium chloride solution contained in the tire tube will not produce corrosion of the insert and thereby affect the bonding between the rubber and insert 16 at its inner end, as was the case noted with the valve device of FIG. 1.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In a valve device having a longitudinal axis, comprising a rubber body having a tubular stem portion and, integral therewith, a base member; a tubular metal insert having a bore; a valve core disposed within the bore of said insert, the insert extending to the lower end of said rubber body and being substantially encased therein; first and second thickened wall portions for said tubular metal insert spaced between a third, thin wall portion of substantially constant inner diameter, the first thickened wall portion being adjacent to and located upwardly of the lower end of said valve core, the second thickened wall portion being adjacent the lower end of said insert and having interior and exterior lower surfaces, whereby said bore for the passage of fluid comprises a first part defined by said thin wall portion of constant inner diameter, and a second part defined by the second thickened wall portion at which the bore diameter is lessened; the improvement comprising:

a hook-like annular projection at the lower end of said insert, said hook-like annular projection being completely surrounded by the rubber of said body so that the interior portion of rubber defines a continuing third part of said bore, the diameter of the third bore part defined by said interior portion of rubber being at least as great as the substantially constant inner diameter of the thin wall portion of said insert between said first and second thickened wall portions, the interior lower surface of said second thickened wall portion being tapered downwardly outwardly; further, in which said hook-like annular projection is thinner than said second thickened wall portion, and extends downwardly for a short distance from approximately a central location between the interior and exterior lower surfaces of said second thickened wall portion and then is curved outwardly of said valve axis, and in which said interior portion of rubber extends upwardly so as to contact said tapered interior lower surface of said second thickened wall portion above said hook-like annular projection;

further, in which the diameter of said interior portion of rubber decreases with distance toward the lower end of said rubber body.

* * * * *